PUSH-PULL MAGNETIC AMPLIFIER HAVING TRANSISTOR SWITCHES

Filed March 27, 1958 2 Sheets-Sheet 1

Inventor:
David L. Lafuze,
by Merton D. Moore
His Attorney.

Inventor:
David L. Lafuze,
by Merton D. Moore
His Attorney.

Patented July 17, 1962

3,045,174

PUSH-PULL MAGNETIC AMPLIFIER HAVING TRANSISTOR SWITCHES

David L. Lafuze, Cincinnati, Ohio, assignor to General Electric Company, a corporation of New York
Filed Mar. 27, 1958, Ser. No. 724,369
9 Claims. (Cl. 323—89)

The present invention relates to high efficiency magnetic amplifiers and, more particularly, to magnetic amplifiers of the push-pull type having transistor switches across the load for providing low impedance current paths bypassing the load in the absence of a signal.

There are many applications in the control field requiring an amplifier having an output which reflects both the polarity and magnitude of the controlling signal. Push-pull types of magnetic amplifiers have been developed to meet such requirements. At first, push-pull magnetic amplifiers were provided with ballast or coupling resistors and, while the operation was satisfactory as far as the polarity between the input control signal and output was concerned, there was a decided disadvantage inherent in the circuits in that the power capabilities were wasted in such resistors.

The next step in development of push-pull magnetic amplifiers replaced the coupling resistors with switching diodes, and an improvement in power capabilities was attained while maintaining the previously obtained advantages. However, a dummy load having a resistive element was necessary for proper operation and, while the improvement resulted, the efficiency of the circuit was still limited by the resistive element of the dummy load. Another disadvantage has been found to be the difficulty in matching the actual load and the dummy load impedances for the most efficient operation within the limitations of the circuit.

It is therefore an object of my invention to provide a push-pull magnetic amplifier which obviates the necessity of such power wasting coupling and dummy load resistances.

Another object of the invention is to provide such a push-pull magnetic amplifier having increased efficiency.

A further object of my invention is to provide in such a magnetic amplifier switching means responsive to the control voltage to control the current paths in such a way as to provide an output having the same phase and polarity as the control voltage.

Accordingly, the invention in brief comprises an arrangement of saturable reactors with transistors interconnected in the load side of the circuit as switches to provide low impedance return paths for currents flowing during portions of the operation of the circuit. As the transistors function as switches, their power handling capabilities are most fully utilized because, in such operation, there is little power dissipation.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings in which:

Figure 1:
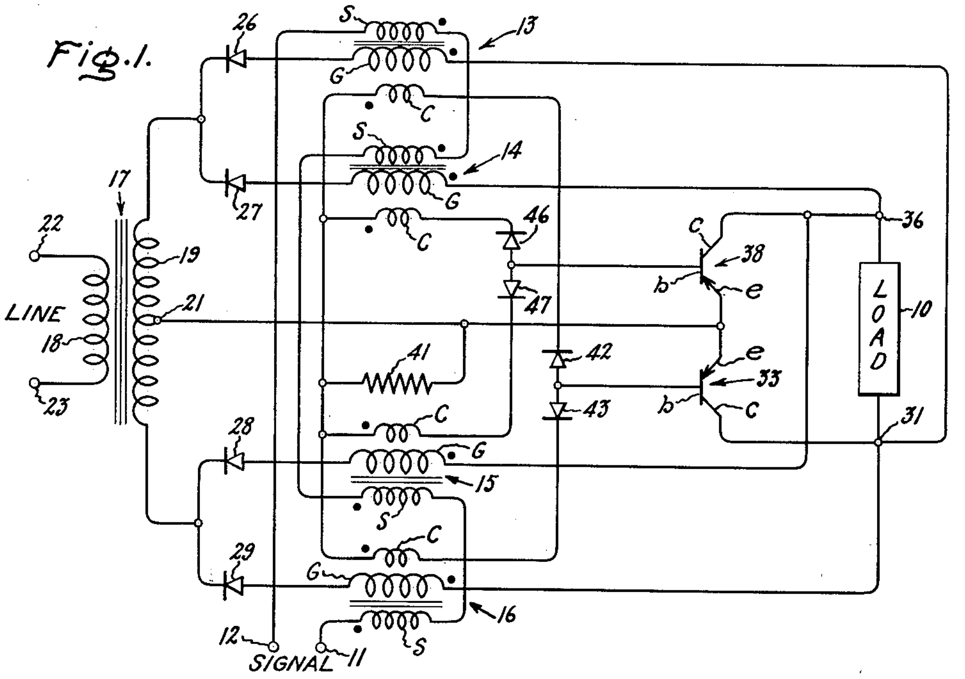
FIGURE 1 is a schematic diagram of the push-pull magnetic amplifier of the present invention.

Referring now to FIGURE 1 of the drawing, I have shown therein an embodiment of my invention for controlling the voltage across a load 10 in response to a control signal applied at the terminals 11 and 12 bearing the legend Signal on the drawing. The system comprises four saturable reactors 13, 14, 15, and 16 which have alternating current gate windings G, signal windings S, and switch control windings C, respectively, with the windings of each reactor wound on legs of four, preferably separate, magnetic cores (not shown). Additional bias windings with which the reactors 13 to 16 are provided are omitted from the drawing for simplicity of illustration, since the structural relationship and operation of such windings are conventional.

To provide an alternating current operating voltage for the invention, a transformer 17, having a primary winding 18 and a secondary winding 19 with a center tap 21, which may be grounded, is illustrated with the primary winding connected between two terminals 22 and 23 for further connection to a source of alternating current, labeled Line in the drawing, such as a conventional utility outlet (not shown).

In accord with the invention current flow is limited to one direction in each of the gate windings G by four similarly poled unidirectional conducting devices, 26, 27, 28 and 29, respectively connected in series circuit relationship with respect to windings G. These devices 26 to 29 are so poled that current flows in one half of the secondary winding 19 only during one half cycle of the applied alternating voltage and current flows in the other half of the secondary winding 19 only during the other half cycle.

As shown in the drawing the upper half of secondary winding 19 is connected in two circuits, one of which includes rectifier 26, gate winding G of saturable reactor 13 to terminal 31 of the load 10 and thence through elements *c*, *b*, and *e* of transistor 33 back to the midpoint 21 of winding 19. The other circuit includes rectifier 27, gate winding G of reactor 14 to terminal 36 of the load 10 and thence through elements *c*, *b* and *e* of transistor 38 back to the midpoint 21 of the winding 19.

Similarly, the lower half of the secondary winding 19 is connected in two circuits, one of which includes rectifier 28, gate winding G of reactor 15 to terminal 36 of the load 10, and through elements *c*, *b*, and *e* of transistor 38 back to center tap 21 of secondary winding 19. The other circuit includes rectifier 29, gate winding G of reactor 16 to output terminal 31, and then through elements *c*, *b*, and *e* of transistor 33 back to center tap 21 of secondary winding 19.

As a controlled switch between output terminal 31 and the center tap 21 of secondary winding 19 a device, such as transistor 33, is provided with two alternate biasing circuits one of which comprises control winding C of reactor 13, through bias resistor 41, transistor 33 (from emitter *e* to base *b*), and then through rectifier 42 back to control winding C. The alternate circuit includes control winding C of saturable reactor 16, through bias resistor 41, transistor 33 (from emitter *e* to base *b*), and thence through rectifier 43 back to control winding C.

Similarly, two alternate bias circuits are provided for switch operation of transistor 38 between output terminal 36 and center tap 21, and one circuit includes control winding C of reactor 14, through bias resistor 41, transistor 38 (from emitter *e* to base *b*), and then through rectifier 46 back to control winding C. The other circuit comprises control winding C of reactor 15, through bias resistor 41, transistor 38 (from emitter *e* to base *b*), and then through rectifier 47 back to the control winding C.

Each of the rectifiers 42, 43, 46 and 47 is so poled that voltages induced in control windings C from associated gate windings G result in a rectified voltage at transistors 33 and 38 which is negative at base *b* with respect to emitter *e* so that gate winding current can flow from emitter *e* to collector *c*.

It is to be noted in connection with the foregoing that control windings C may have a low number of turns of small wire because the windings supply only the substantially low control voltage required by transistors 33 and 38. The number of turns may be established by the voltage needed to cause a transistor base current required for slightly more than the load current. Also, the bias resistor 41 serves to decrease the effect of base to emitter input impedance changes in the transistors 33 and 38 because of changes in temperature.

To control magnetic saturation of the cores of reactors 13 to 16, and thus the reactance of gate windings G, in response to a control signal, such as derived from a programming control circuit for an electrical sign, or error signals from a system to be regulated, signal windings S are connected in series between input terminals 11 and 12. As is conventional in the control of push-pull magnetic amplifiers, one signal winding S of each pair of reactors 13, 14 and 15, 16 is connected and wound on the respective core so that flux produced by signal current hastens saturation of the core and the second signal winding S of each pair of reactors is connected and wound to provide a flux in the core which retards saturation.

In considering the operation of the push-pull magnetic amplifier of FIGURE 1, it is assumed first that there is no applied control signal between terminals 11 and 12, that all reactors 13 to 16 are biased equally (bias windings and supply not shown), and that the magnetization of the cores of the reactors is at some unsaturated value, which is a function of the value of the applied bias.

Thus, at the start of the half cycle of the alternating current supply voltage in which the rectifiers 26 and 27 are conductive, any current leaking through transistors 33 and 38, from emitter *e* to collector *c*, respectively, results in a flow of leakage current from center tap 21 through transistors 33 and 38 and gate windings G, of reactors 13 and 14 and through rectifiers 26, 27 back to the secondary winding 19. An alternative starting current circuit exists when current flows in the reverse direction from the secondary winding 19 through rectifiers 28 and 29, which may not be perfect unidirectional current devices, through gate windings G of reactors 15 and 16, and then through gate windings G of reactors 13 and 14 and rectifiers 26 and 27 back to the secondary winding 19. Flow of current in either circuit, which includes gate windings G of reactors 13 and 14, induces a voltage, by transformer action, in the respective control windings C. Such induced voltage is rectified and applied between the emitter *e* and base *b* of transistors 33 and 38 to render the latter element negative with respect to the former to permit more current flow through the transistors from emitter *e* to collector *c* and thus the gate windings G of reactors 13 and 14. The foregoing action is cumulative and results in the transistors 33 and 38 being switched quickly to a full-on state because of increasing transformed voltage. With both transistors 33 and 38 fully on, the gate windings G of reactors 13 and 14 withstand the full voltage of the top half of secondary winding 19, but no current flows through load 10 because terminals 31 and 36 are at the same potential. That is, load 10 is short-circuited by transistors 33 and 38.

Both reactors 13 and 14 were assumed to be biased equally so that saturation of the respective cores occurs at the same time and when they saturate there is no inrush of current to the gate windings G as is usually associated with the saturation of reactors because upon saturation the voltages induced in control windings C of reactors 13 and 14 disappear and transistors 33 and 38 become non-conductive between elements *c* and *e*. Still no current flows in load 10 because both of its terminals 31 and 36 are at the same potential.

During the remainder of the half cycle of alternating current supply, under discussion, magnetization of the cores of reactors 13 and 14 remains at the saturated level and the foregoing current paths and switching action of the transistors 33 and 38 remains until the termination of the half cycle. During the following half cycle when the rectifiers 28 and 29 are conductive, the same operation occurs with respect to the other pair of reactors 15 and 16.

Next consider the operation of the embodiment of FIGURE 1 by applying a control signal to the terminals 11 and 12 which makes the core of reactor 13 saturate early during the alternating current supply and the core of reactor 14 saturate later. Under such condition, the control signal does not affect operation until the core of reactor 13 saturates, at which time gate winding G of the other reactor 14 continues to transform current into the control winding C in the base *b* and emitter *e* circuit of transistor 38. Thus, transistor 38 remains conductive and transistor 33 becomes non-conductive. Current then flows from the center tap 21 of secondary winding 19, through transistor 38, load 10 from terminal 36 to terminal 31 and thence out through the gate winding G of reactor 13. Meanwhile, transistor 33 has been cut off, as previously related, because of saturation of the core of reactor 13 and is maintained firmly non-conductive from emitter *e* to collector *c* by the voltage drop, across the bias resistor 41 as impressed between the base *b* and emitter *e*, resulting from current flow in the base circuit of transistor 38. Current continues to flow through the load 10 in the manner set forth above until the core of reactor 14 also saturates and there is no longer a voltage transformed from the gate winding G into the control winding C so that transistor 38 is rendered non-conductive for current flow from emitter *e* to collector *c*.

Figure 3:
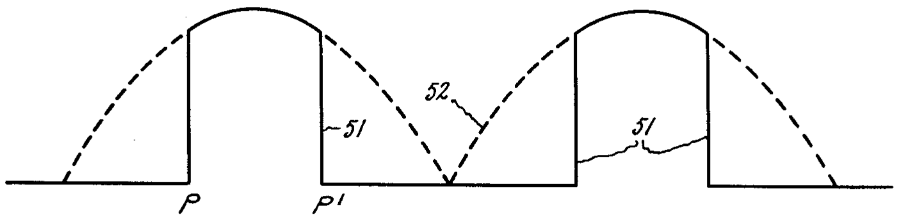
FIGURE 3 is a waveform diagram of the output of the circuits of FIGURES 1 and 2.

FIGURE 3 shows by the full line curve 51 the wave shape produced in the load 10 by operation above described, reactor 13 saturates at the point P permitting current represented by curve 51 to flow in load 10 until reactor 14 saturates at point $P^1$ thereby interrupting current in the load.

By increasing the control voltage the saturation of reactor 13 occurs earlier in the half cycle and saturation of reactor 14 occurs later in the half cycle thereby broadening or lengthening the pulses represented by curve 51 until the output becomes a succession of half sine waves as represented by dashed curve 52.

If the polarity of the voltage applied to the signal circuit be reversed, then the reactors 13 and 14 saturate in the reverse order with the result that the polarity of current in the load 10 is reversed. Thus, the polarity of current in the load 10 corresponds to that in the signal circuit.

It is to be noted that in the foregoing description of operation, any leakage current of the transistors 33 and 38 from emitter *e* to collector *c*, respectively, does not pass through the load 10 and, therefore, there is minimum power wastage during such period of operation.

Figure 2:
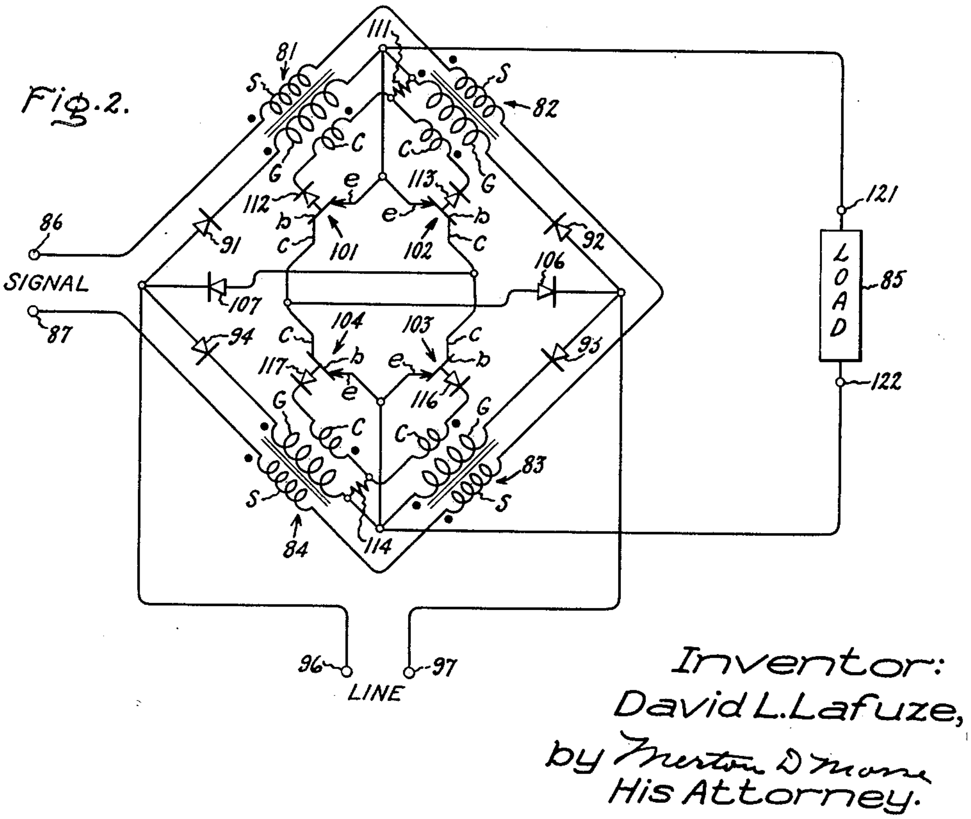
FIGURE 2 is a schematic diagram of a modification of FIGURE 1.

A second embodiment of my invention is shown in FIGURE 2 of the drawing, wherein there are four saturable reactors 81, 82, 83 and 84 connected in a bridge type circuit to operate as a push-pull magnetic amplifier for controlling the voltage across a load 85 in response to a control signal, impressed between terminals 86 and 87 and labeled Signal on the drawing. Also, as illustrated, reactors 81 to 84 each have three windings, namely, signal windings S, alternating current gate windings G, and control windings C, with such windings wound on legs of four, preferably separate, magnetic cores (not shown). As in the previously described embodiment of the invention each of the reactors 81–84 has a bias winding and bias supply, which are conventional in structure and operation and are omitted from FIGURE 2 for simplicity and clarity of illustration.

In accord with the invention, each of the gate windings G of reactors 81–84 are included in a series circuit with unidirectional conducting devices 91–94, respectively, between load 85 and a source of alternating current (not shown), such as a conventional utility outlet, connected between two terminals 96 and 97, and labeled Line on the drawing, these circuits including particular transistors 101 to 104 as will presently be described. The unidirectional devices 91 to 94 are so poled that current can flow in only one direction through gate windings G between the load 85 and terminals 96 and 97.

Controlled low impedance return paths for current flowing through gate windings G between the load 85 and terminals 96 and 97 are provided by four transistors 101, 102, 103 and 104 interconnected as switches between such elements. Thus, during one half cycle of the supply voltage when rectifiers 91 and 94 are conductive, one series circuit extends from terminal 96 through rectifier 91, gate winding G of reactor 81, and transistor 101 from emitter *e* to collector *c*, and then through rectifier 106 to terminal 97. This circuit does not include load 85. A second series circuit extends from terminal 96 through rectifier 94, gate winding G of reactor 84, transistor 104 from emitter *e* to collector *c*, and thence through rectifier 106 to terminal 97.

Two additional series circuits are provided for the flow of current during the succeeding half cycle of supply voltage and one circuit extends from terminal 97 through rectifier 92, gate winding G of reactor 82, transistor 102 from emitter *e* to collector *c*, and then through rectifier 107 to terminal 96. The other circuit extends from terminal 97 through rectifier 93, gate winding G of reactor 83, transistor 103 from emitter *e* to collector *c*, and then through rectifier 107 to terminal 96. The two rectifiers 106 and 107 are so poled that current only flows toward the respective terminal 97, 96 to which it is connected.

Each of the transistors 101 to 104 is controlled as a switch by voltage induced in one of control windings C by the associated gate winding G. Thus, control winding C of reactor 81 is connected in one bias circuit which extends from one terminal of winding C through resistor 111, transistor 101 from emitter *e* to base *b*, and through rectifier 112 back to the opposite terminal of control winding C. A second bias circuit, including control winding C of reactor 82, extends through resistor 111, transistor 102 from emitter *e* to base *b*, and then through rectifier 113 back to the opposite terminal of control winding C. A third bias circuit includes control winding C of reactor 83 and extends through resistor 114, transistor 103 from emitter *e* to base *b*, and then through rectifier 116 back to control winding C. A fourth bias circuit, including control winding C of reactor 84, extends through resistor 114, transistor 104 from emitter *e* to base *b*, and rectifier 117 back to control winding C.

The rectifiers 112, 113, 116, and 117 are similarly poled so that only voltages of control windings C, which render the base *b* more negative than the emitter *e* of respective transistors 101 to 104, are passed to permit current flow from emitter *e* to collector *c* as a closed switch. Other voltages are then blocked and transistors 101 to 104 are non-conductive from emitter *e* to collector *c* so that the transistors then serve as open switches.

To control the flow of current through the load 85 the four signal windings S are series-connected between terminals 86 and 87 for connection to a source of unidirectional signal voltage similar to that discussed with respect to the embodiment of FIGURE 1. One signal winding S of each pair of reactors 81, 84 and 82, 83, which is active during one half cycle of the supply voltage, is wound on its respective core and connected in the series circuit so that saturation of the core is hastened, whereas the other two signal windings are wound and connected to retard saturation.

With the embodiment of FIGURE 2 connected in accordance with the foregoing paragraphs and with the reactors 81 to 84 biased equally so that the cores thereof saturate at substantially the same time as the alternating current supply, the operation is substantially the same as set forth for the embodiment of FIGURE 1 and no current flows through the load 85 in the absence of a control signal. As supply terminal 96 becomes positive at the start of the positive half cycle of the alternating current supply, one pair of gate windings G of reactors 81 and 84 become active, but no current flows through either of such windings, as there is no path to the other supply terminal 97 except through substantially inactive transistors 101 and 104 and rectifier 106 and both sides of load 85 are at the same potential. However, any leakage through transistors 101 and 104 or through the unidirectional devices 92 and 93, which may not be perfect in the reverse direction, results in some current flow through gate windings G of reactors 81 and 84 to induce voltages in associated control windings C. Bases *b* of the transistors 101 and 104, respectively, are then biased negatively with respect to emitters *e* for conduction from emitter *e* to collector *c* thereby providing paths through rectifier 106 to supply terminal. 97. When the cores of the two reactors 81 and 84 saturate there is still no current flow through the load 85 because the associated transistors 101 and 104 are rendered nonconductive when the transformed voltage of the control windings C ceases at the time of such saturation. For the same reason no rush of current occurs in winding G when saturation occurs.

Now, to provide controlled current flow through the load 85 a control signal is impressed between terminals 86 and 87 and operation is the same as described above until saturation of one of the cores of the two active reactors 81 and 84 (during the half cycle of supply voltage that terminal 96 is positive). It is to be recalled that, prior to saturation of the cores of reactors 81 and 84, both transistors 101 and 104 are conductive from emitter *e* to collector *c* and no current flows through the load 85. Upon saturation of the core of reactor 81, voltage is no longer transformed into the control winding C and the transistor 101 ceases to conduct; however, transistor 104 continues conductive and a current path now exists from the terminal 96 through gate winding G of reactor 81, load 85, transistor 104 (from emitter *e* to collector *c*), and through unidirectional device 106 to terminal 97. When the core of the other reactor 84 becomes saturated at a later time because of the control signal, the transistor 104 associated with such reactor 84 is turned off and current through the load 85 falls to zero. Thus a pulse such as that between points P and P[1] illustrated in FIGURE 3 occurs in the load 85.

During the next half cycle of the supply voltage, operation of the reactors 82 and 83 is the same as outlined above for reactors 81 and 84 and current flows through the load 85 in the same direction as controlled by the control signal.

With the availability of transistors capable of handling higher values of power, the push-pull magnetic amplifiers of FIGURES 1 and 2 are useful for direct control in an enlarging field of control applications. By utilizing the transistors in the circuit as switches, their maximum power handling capabilities are utilized and the circuits are able to deliver power with at least twice the efficiency of the push-pull amplifier having dummy loads.

Figure 4:
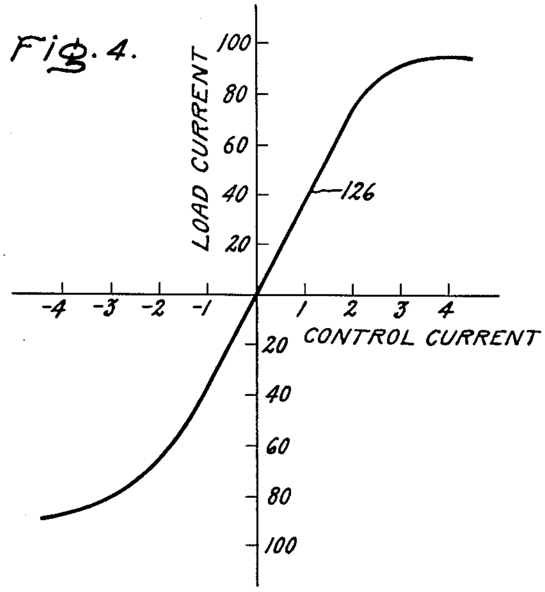
FIGURE 4 is a load to control current characteristics of FIGURES 1 and 2 under equal saturation angle bias of the reactors so that no load current flows with zero control current.

As shown in FIGURE 4 of the drawing, wherein signal control current is plotted against load current for the push-pull magnetic amplifiers of FIGURES 1 and 2 to provide a load characteristic curve 126, a reversal of the polarity of the signal control current results in a reversal of the current through the load. Also, FIGURE 4 indicates that by biasing the reactors of the two embodiments equally so that no load current flows at zero signal control current, the load characteristic 126 of the amplifiers operates in a substantially linear manner, especially at low values of signal control current.

While particular embodiments of this invention have been shown it will, of course, be understood that it is not limited thereto since many modifications both in the circuit arrangement and in the instrumentality employed may be made. It is contemplated by the appended claims to cover any such modifications as fall within the true spirit and scope of this invention.

What I claim as new and desire to secure by Letters Patent of the United States is:

1. In a high efficiency push-pull magnetic amplifier, the combination comprising a plurality of saturable core reactors having at least alternating current gate windings, control windings and signal windings, said gate windings connected in series with unidirectional conducting devices between a source of operating voltage and a load, said signal windings being adapted for energization by applied signals to control saturation periods of said reactors, and at least two low impedance switch means connected between said load and said source of operating voltage with control elements connected to and controlled by said control windings for operation to provide load current only in response to said signals.

2. In a high efficiency push-pull magnetic amplifier, the combination comprising a plurality of saturable core reactors having at least alternating current gate windings, control windings and signal windings, said gate windings connected in series with unidirectional conducting devices by pairs between a source of alternating current and a load, said signal windings being adapted for energization by desired signals to control saturation periods of said reactors, and at least two transistor switches connected between said load and said source of alternating current with control elements connected to and controlled by said control windings for operation to provide load current only in response to said signals.

3. In a high efficiency push-pull magnetic amplifier, the combination comprising a plurality of saturable core reactors having at least alternating current gate windings, control windings and signal windings, said gate windings connected in pairs between a source of alternating current and a load with unidirectional current devices included to provide current flow in one direction through said gate windings, said signal windings being adapted for energization by desired signals to control saturation periods of said reactors, at least two low impedance switch means connected across said load with a common return connection to said source of alternating current, and control elements of each of said switch means connected to and controlled by said control windings to provide operation of said switches and a flow of current through said load only in response to said signals.

4. In a high efficiency push-pull magnetic amplifier, the combination comprising a plurality of saturable core reactors having at least alternating current gate windings, control windings, and signal windings, said gate windings connected in pairs between a source of alternating current and a load with unidirectional current devices included to provide current flow only in one direction through said gate windings, said signal windings being adapted for energization by desired signals to control saturation periods of said reactors, at least two transistors connected across said load with a common return path to said source of alternating current, and control elements of each of said transistors connected to said control windings to provide switching operation of said transistors and a flow of current through said load only in response to said signals.

5. In a high efficiency push-pull magnetic amplifier, the combination comprising a plurality of saturable core reactors having at least alternating current gate windings, control windings and signal windings, said gate windings connected in pairs between a source of alternating current and a load with unidirectional current devices included to provide current flow only in one direction through said gate windings, said signal windings being adapted for energization by desired signals to control saturation periods of said reactors, and at least two transistors having base, emitter, and collector electrodes, said emitter electrodes connected together and to an intermediate point of said alternating current source, said collector electrodes respectively connected to different sides of said load, said base electrodes connected to said control windings to provide switching operation of the emitter to collector conductivity of said transistors and a flow of current through said load only in response to said signals.

6. In a high efficiency push-pull magnetic amplifier, the combination comprising four saturable core reactors having at least alternating current gate windings, control windings and signal windings, a center-tapped source of alternating current, said gate windings connected in pairs between said source and a load, each of such connections including unidirectional devices for limiting current flow to one direction through said gate windings, said signal windings being adapted for energization by desired signals for hastening saturation of one of each of said pairs of reactors and delaying saturation of the others, a pair of transistor switches connected in series across said load with a common connection to the center tap of said source of alternating current, the control element of said transistors being connected to said control windings for switching conductive periods of said transistors to provide current through said load only in response to said signals.

7. In a high efficiency push-pull magnetic amplifier, the combination comprising four saturable core reactors having at least alternating current gate windings, control windings, and signal windings, a center-tapped source of alternating current, said gate windings connected in pairs between said source and a load, each of such connections including unidirectional devices for limiting current flow to one direction through said gate windings, said signal windings being adapted for energization by desired control signals for hastening saturation of one of each of said pairs of reactors and delaying saturation of the others, a pair of transistors each having an emitter, collector, and base with the emitters commonly connected to the center tap of said source of alternating current and the collectors respectively connected to opposite sides of said load, the bases of said transistors respectively connected through unidirectional devices to control windings of one of each pair of reactors, and means connected between a common connection of said control windings and said center tap to complete bias circuits for said bases, whereby current flows through said load only in response to said control signals.

8. In a high efficiency push-pull magnetic amplifier, the combination comprising four saturable core reactors having at least alternating current gate windings, signal windings and control windings, said gate windings connected to provide a four-sided bridge circuit with such connections including a unidirectional device in each side limiting current flow to the same direction in each gate winding, a source of alternating current connected between two opposite corners of said bridge circuit, a load connected between the remaining two corners of said bridge circuit, said signal windings being adapted for energization by desired signals to hasten saturation of one of said reactors connected to each terminal of said alternating current source and delay saturation of the other two reactors, four low impedance switches interconnected to provide a secondary four-sided bridge circuit with two opposite corners respectively connected to sides of said load, the remaining corners of said secondary bridge respectively connected to opposite sides of said source of alternating current with rectifiers included to limit current flow only toward such source, and separate means connecting the control winding of said saturable reactors to a respective control element of each switch to provide switching operation thereof and current through said load only in response to said signals.

9. In a high efficiency push-pull magnetic amplifier, the combination comprising four saturable core reactors having at least alternating current gate windings, control windings and signal windings, said gate windings connected to provide a four-sided bridge circuit with such connections including a unidirectional device in each side limiting current flow to one direction in each gate winding, a source of alternating current connected between two opposite corners of said bridge circuit, a load connected between the remaining two corners of said bridge circuit, said signal windings for energization by signals to hasten saturation of one of said reactors connected to each terminal of said source of alternating current and delay saturation of the other reactors, four transistor switches interconnected to provide a secondary four-sided bridge circuit with two opposite corners respectively connected to sides of said load, the remaining corners of said secondary bridge circuit respectively connected to opposite sides of said source of alternating current with unidirectional devices included to limit current flow only toward such source, and means connected between said control windings and to a respective control element of said transistor switches to provide switching of conductive periods and a current flow through said load only in response to said signals.

References Cited in the file of this patent

UNITED STATES PATENTS

| | | |
|---|---|---|
| 2,432,399 | Edwards | Dec. 9, 1947 |
| 2,798,904 | Alexanderson | July 9, 1957 |